(No Model.)

W. BECHTOLD.
SINK STRAINER AND TRAP.

No. 423,658. Patented Mar. 18, 1890.

WITNESSES:  
INVENTOR  
William Bechtold  
ATTORNEYS.

UNITED STATES PATENT OFFICE.

WILLIAM BECHTOLD, OF NEW YORK, N. Y.

SINK STRAINER AND TRAP.

SPECIFICATION forming part of Letters Patent No. 423,658, dated March 18, 1890.

Application filed July 6, 1889. Serial No. 316,658. (No model.)

*To all whom it may concern:*

Be it known that I, WILLIAM BECHTOLD, a citizen of the United States, and a resident of the city, county, and State of New York, have invented certain new and useful Improvements in Sink Strainers and Traps, of which the following is a specification.

The object of my invention is to provide a new and improved combined sink strainer and trap, which is simple in construction, effective in use, and can be applied on any sink or basin.

The invention consists in the combination, with a sink, of a strainer held in the bottom of the same and provided with a groove surrounding the strainer and below the upper surface of the sink-bottom, and a cap fitting over the strainer, the edges of which cap can pass into the above-mentioned groove.

The invention also consists in the construction and combination of parts and details, as will be fully described and set forth hereinafter, and finally pointed out in the claims.

Figure 1:
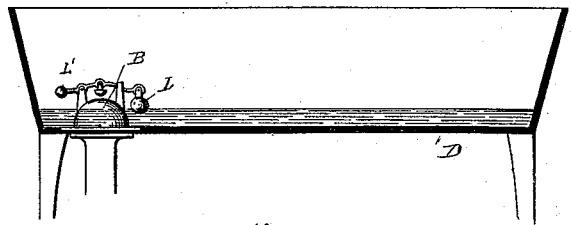
Figure 2:
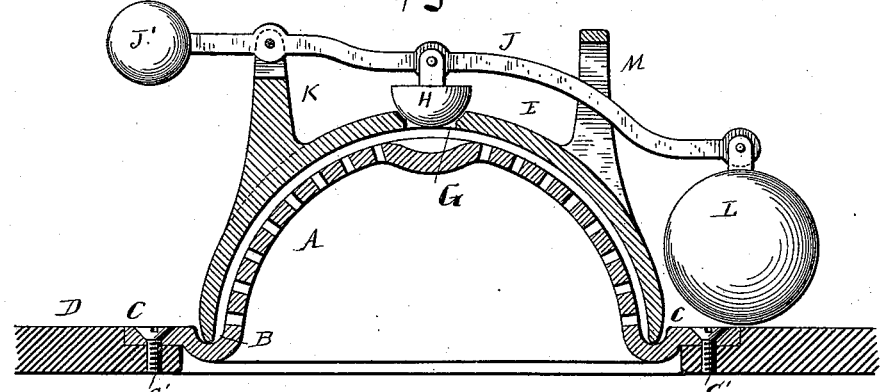
Figure 3:
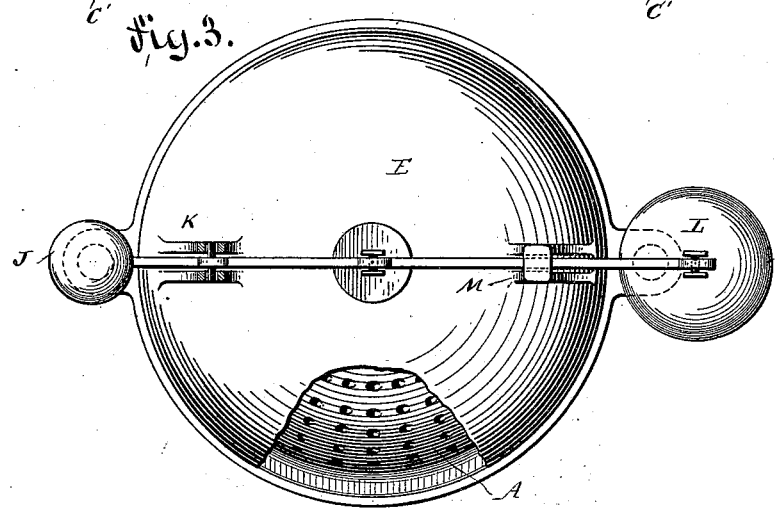
Figure 4:
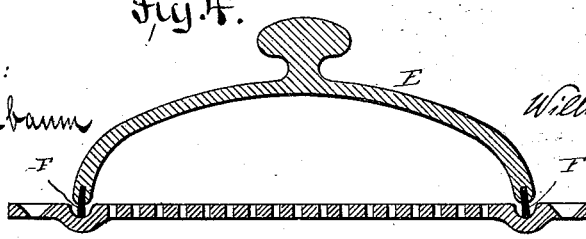

In the accompanying drawings, Figure 1 is a longitudinal sectional view of a sink provided with my improved combined sink strainer and trap. Fig. 2 is an enlarged vertical longitudinal sectional view of my improved strainer and trap. Fig. 3 is a top view of the same, parts being broken out. Fig. 4 is a longitudinal sectional view of a modification.

Similar letters of reference indicate corresponding parts.

The strainer A, made of cast metal in the usual manner, is approximately hemispherical in shape, and is provided along its edge with an exterior annular groove B, and with two or more lugs C for receiving fastening-screws C', that hold the strainer in place in the opening in the bottom of the sink D. When said strainer is held in place in the bottom of the sink, the groove B will be slightly below the upper surface of said sink-bottom, so that it at all times remains filled with water.

To prevent the escape of gases through the strainer, a hemispherical cap E is placed over the same, which may have its bottom edge tapered, as shown in Fig. 2, so as to adapt it to rest on the bottom of the groove B; or a strip F, of rubber, may be held edgewise in the edge of the cap E, the bottom edge of said rubber strip resting on the bottom of the groove B, as shown in Fig. 4. Said cap may be provided with a central opening G, closed by a valve H, pivoted to a lever J, one end of which is pivoted to standards K on the cap E, the other end of said lever carrying a float L.

M are standards for guiding the lever J.

J' is a counter-weight on the lever J.

When the cap E is placed on the strainer and the water rises in the sink, as shown in Fig. 1, it raises the float L, whereby the valve H is raised, thus permitting the water to pass through the aperture G to the strainer. As soon as the level of the water descends, the float also descends, and the valve H closes the opening G, as shown in Fig. 2.

The strainer may be made horizontal; but the curved shape is preferred.

Having thus described my invention, I claim as new and desire to secure by Letters Patent—

1. The combination, with a sink, of a strainer held in the same and provided along its rim with a groove which is below the upper surface of the bottom of the sink, and a cap the edges of which fit on the bottom of said groove, substantially as set forth.

2. The combination, with a sink, of a strainer held in the same and provided along its rim with a groove which is below the upper surface of the bottom of the sink, and a cap fitting over the strainer and provided with a rubber strip projecting from its bottom edge, substantially as set forth.

3. The combination, with a sink, of a strainer held in the same and provided along its rim with a groove which is below the upper surface of the bottom of the sink, a cap fitting over the strainer and having a top opening, a valve for closing said top opening, a lever pivoted on the standard of the cap, to which lever said valve is pivoted, and a float on the other end of said lever, substantially as set forth.

In testimony that I claim the foregoing as my invention I have signed my name in presence of two subscribing witnesses.

WILLIAM BECHTOLD.

Witnesses:
OSCAR F. GUNZ,
JOHN ALONZO STRALEY.